United States Patent
Ponce Cabrera et al.

(10) Patent No.: US 12,532,814 B2
(45) Date of Patent: Jan. 27, 2026

(54) METHOD TO ENHANCE SUBSTANCES UPTAKE BY PLANTS USING SELECTIVE ABLATION OF LIGHT PULSES TO REMOVE THE WAX CUTICLE

(71) Applicants: Luis Vidal Ponce Cabrera, Olive Branch, MS (US); Teresa Flores Reyes, Olive Branch, MS (US); Alejandro Ponce Flores, Olive Branch, MS (US)

(72) Inventors: Luis Vidal Ponce Cabrera, Olive Branch, MS (US); Teresa Flores Reyes, Olive Branch, MS (US); Alejandro Ponce Flores, Olive Branch, MS (US)

(73) Assignee: ONTEKO INC., Olive Branch, MS (US)

( * ) Notice: Subject to any disclaimer, the term of this patent is extended or adjusted under 35 U.S.C. 154(b) by 246 days.

(21) Appl. No.: 18/450,483

(22) Filed: Aug. 16, 2023

(65) Prior Publication Data
US 2025/0057087 A1    Feb. 20, 2025

(51) Int. Cl.
*A01N 25/00*    (2006.01)
*A01G 7/04*    (2006.01)

(52) U.S. Cl.
CPC .............. *A01G 7/045* (2013.01); *A01N 25/00* (2013.01)

(58) Field of Classification Search
None
See application file for complete search history.

(56) References Cited

U.S. PATENT DOCUMENTS

2020/0037607 A1*    2/2020    Ponce Cabrera ...... A01N 25/00

OTHER PUBLICATIONS

Etxeberria, Ed, et al. "The use of laser light to enhance the uptake of foliar-applied substances into citrus (*Citrus sinensis*) leaves." Applications in Plant Sciences 4.1 (2016): 1500106. (Year: 2016).*

* cited by examiner

*Primary Examiner* — Weihua Fan
(74) *Attorney, Agent, or Firm* — Dennemeyer & Associates, LLC (57) ABSTRACT

Disclosed in the present is materials and methods for delivering substances to plants. The invention describes a method to enhance substances uptake by plants using selective ablation of light pulses to remove the wax cuticle on a large scale in fields, comprising steps of light selective ablation of wax based optical properties of leaves, using lasers, pulsed lamps or other light sources like solar filtered solar light to remove the wax selectively without damage the leaves. Also disclosed is material for enhancing substances uptake by plants using selective ablation of light pulses to remove the wax cuticle, comprising selective ablation of light pulses of a wavelength of about 532 nm or within the range 495 to 570 nm.

7 Claims, 7 Drawing Sheets

METHOD TO ENHANCE SUBSTANCES UPTAKE BY PLANTS USING SELECTIVE ABLATION OF LIGHT PULSES TO REMOVE THE WAX CUTICLE

TECHNICAL FIELD

The present invention generally, relates to materials and methods for delivering substances to plants and in particular method to enhance substances uptake by plants using selective ablation of light pulses to remove the wax cuticle on a large scale in fields.

BACKGROUND

Application and absorption of agrichemicals (e.g., foliar nutrients and pesticides) remains difficult in the agricultural field. Aerial sprays are preferred as a means to deliver agrochemicals over large areas, given 
method once the wax cuticle has been removed, the chemical substance is applied, which can easily penetrate the interior of the plant.

In a preferred embodiment, the preferred plant is fresh citrus leaves due to their high reflection rate, low absorption rate, high absorption rate of the wax cuticle, good selectivity of the wax cuticle enabling them to be suitable for selectively ablated and having the capacity to preserve the epidermis without damages. The claimed method, wherein the step of selective ablation is done by a laser using wavelength in the green range of spectrum 495 nm to 570 nm. In a preferred embodiment, the absorption spectrum of leaf extract further comprises: a wavelength ranges of between 350 and 700 nm, and an absorption coefficient of 0.02 and 0.2 m−1. Preferably, the laser selectivity further comprises a minimal damage to cuticle and leaf structure and high removal of wax rate and further comprising for the second harmonic of Nd laser of wavelength 532 nm however, the second harmonic of Nd laser can be of any wavelength in the range 495-570 nm.

In a preferred embodiment, a method for delivering substances to plants, comprising steps of: applying a laser ablation using green wavelength of 532 nm to penetrate epicuticular wax to the epidermal layer; applying laser ablation to enable a therapeutic compound application and penetration through cuticle-exfoliated areas, and successfully enabling the therapeutic compound to reach the epidermal layer. Additionally, it will be seen that in this embodiment the method has: the immediate effect of laser is to impact the leaf surface and generate accessibility for therapeutic compounds through wax cuticle selective ablation; at the step of impacting the leaf surface the area where the laser removed the wax also expose the epidermis; within the treated area, the laser is enabled to remove the wax without affecting the epidermis; the said treated area can be large ranging from mm to cm in diameter with a single laser shot; there is no perforation or thermal damage to the leaf, and further comprising a laser wavelength of about 532 nm, pulse duration of about 1 fs to 100 ns, and repetition rate of about 1-100,000 Hz, and material for enhancing substances uptake by plants using selective ablation of light pulses to remove the wax cuticle, comprising selective ablation of light pulses of a wavelength of about 532 nm or within the range 495 to 570 nm.

The are designed for: delivering substances to plants; removing the wax cuticle on a large scale in fields; improving the capture of agrochemicals through the leaves of plants, which works by removing the wax cuticle to allow access of the substances. The material for selective ablation of light pulses using laser pulses of 532 nm wavelength or within the range 495 to 570 nm for selective wax removal, wherein the laser further comprises short duration process (nanosecond range) minimizing thermal impact; does not need to be focused with a lens; is easy to implement for field conditions, and is compact, portable laser and of low cost.

These and other features, and advantages of the present invention will become apparent from the following detailed description, the accompanying drawings, and the appended claims.

These and other features, and advantages of the present invention will become apparent from the following detailed description, the accompanying drawings, and the appended claims.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another.

Plant cuticle is the outermost layer of plants, which covers leaves, fruits, flowers, and non-woody stems of higher plants. It protects plants against drought, extreme temperatures, UV radiation, chemical attack, mechanical injuries, and pathogen/pest infection. The cuticle is well known for its functions as a diffusion barrier limiting water and solute transport across the apoplast and for its protection of the plant against chemical and mechanical damage, as well as pest and pathogen attack (Riederer, 2006).

Generally, the prior art inventions provide a method of delivering a substance to a plant, the method comprising (a) exfoliating a region of epicuticular wax on a plant surface. The laser energy is applied using an erbium-doped yttrium aluminum garnet (Er:YAG) laser. The method is good, does not damage the leave. The main inconvenient is the high price of laser. In addition, the laser process implies an increase in temperature that can damage the epidermis.

The invention attempts to address the problem of foliar uptake of agrochemicals. It describes bow a laser selective wax removal can be done to enhance the substances uptake by plants. Aerial sprays are preferred as a means to deliver agrochemicals over large areas, given that leaves are the most readily accessible tissues and represent a significant proportion of the total plant body. Although the primary functions of wax layer are to prevent water loss and to act as a defense from pathogens and pests, the wax also make foliar applications of agrichemicals difficult. The movement of substances across the cuticle and into leaves is most feasible through the stomatal openings. But the collective area of stomatal openings is reduced.

Now according to the invention, the idea or subject matter teaches of an improvement of the substances uptake by selective laser ablation. The invention is based on selectivity, wherein the process is based on the high reflectivity of leaves for green light. The invention is designed to using a green laser beam the wax that can be removed selectively, without damaging any other part of the leaf.

There are two patents related to this invention. One issued patent and other is an abandoned application. However, they both use different approached and mechanism to improve the substance uptake by the plant.

The subject matter of the present invention is new and exceeds the previous prior art disclosures in many aspects.

The U.S. Patent US20190116741A1 aims to increase penetration of substances across leaf surface and subsequent transport into the phloem, in which a group of researchers from UF introduced a $CO_2$ laser, creating indentations of approximately 250 μm in diameter. The method described in this patent is based in perforations to enhance the foliar intake of substances.

Figure 1A:
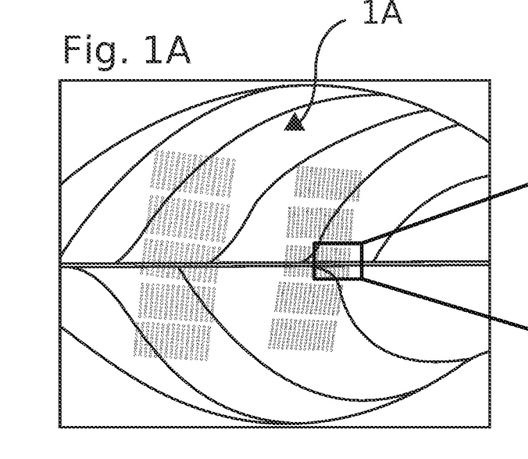
FIG. 1A represents how micro-perforations prior art patent works as described in the present invention.
Figure 1B:
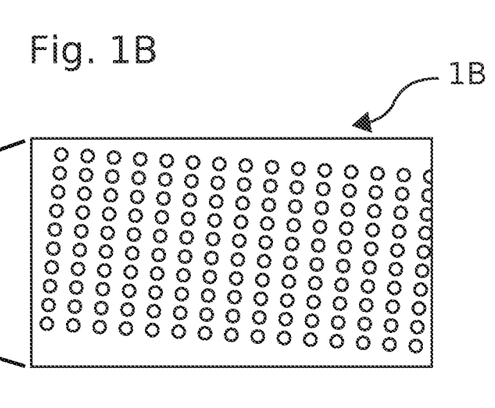
FIG. 1B is an enlarged view of the micro-perforations.
Figure 1C:
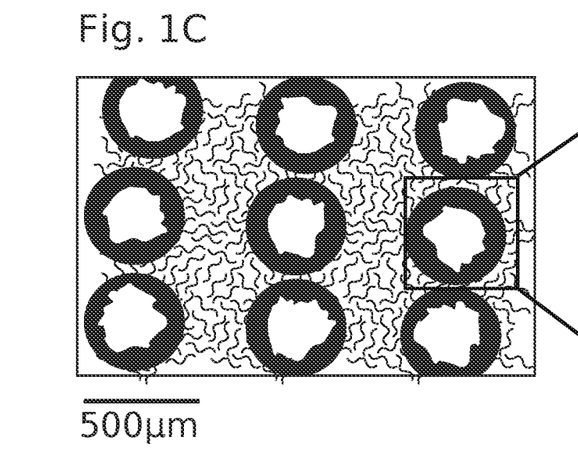
FIG. 1C is an enlarged view of elements of the micro-perforations.
Figure 1D:
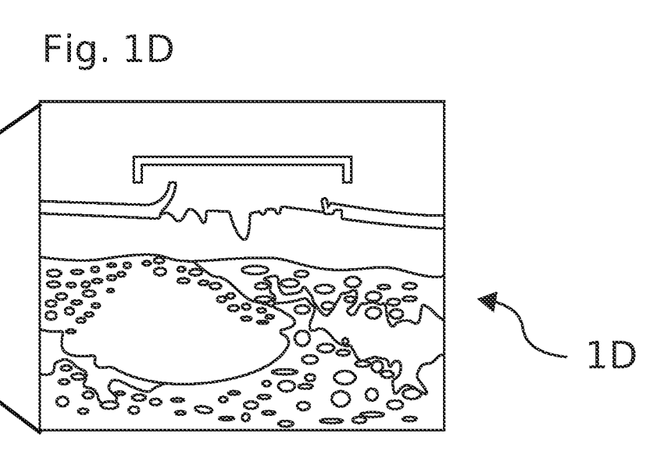
FIG. 1D is an enlarged view of the elements shown in FIG. 1C.
Figure 2:
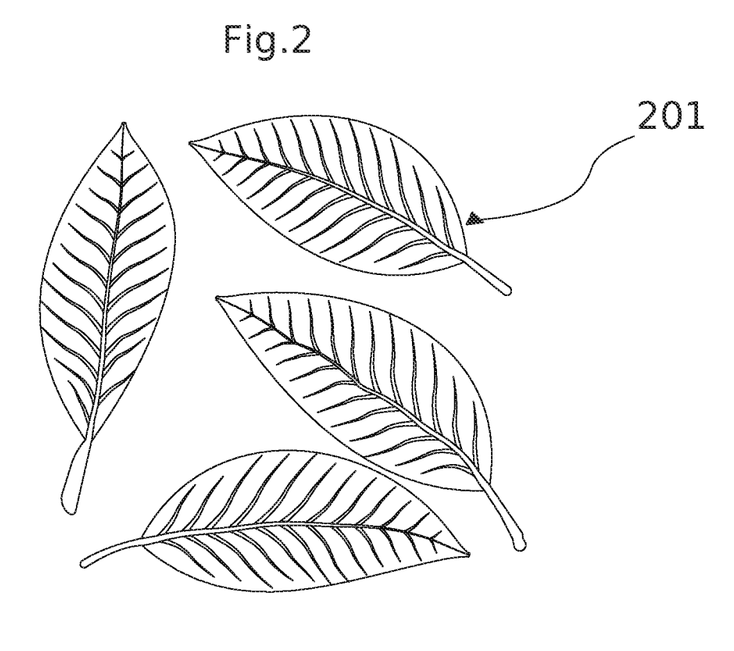
FIG. 2 is a diagrammatic illustration of Citrus leaves.
Figure 3:
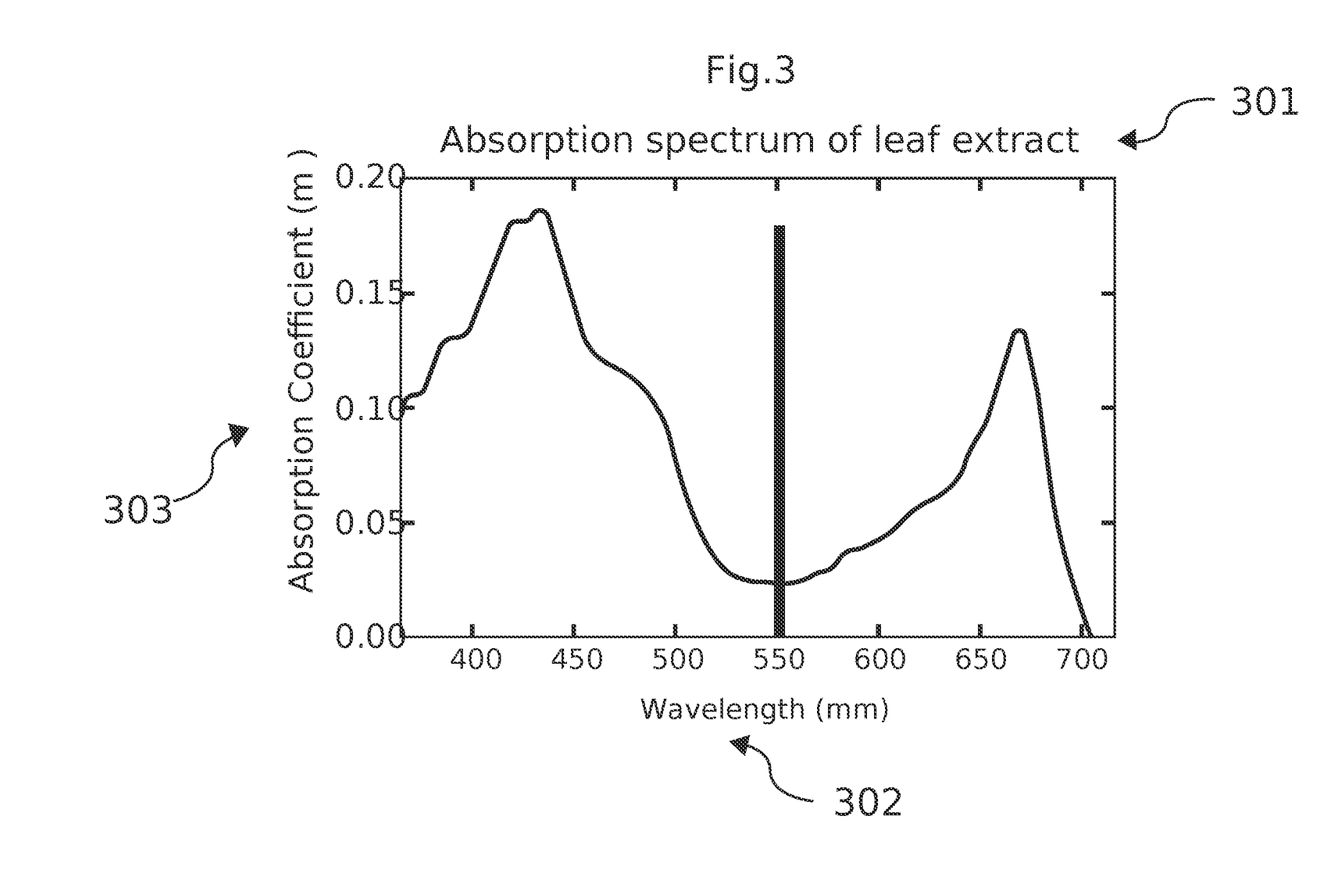
FIG. 3 is a graph of selective ablation by laser using wavelength in the green range of spectrum.
Figure 4:
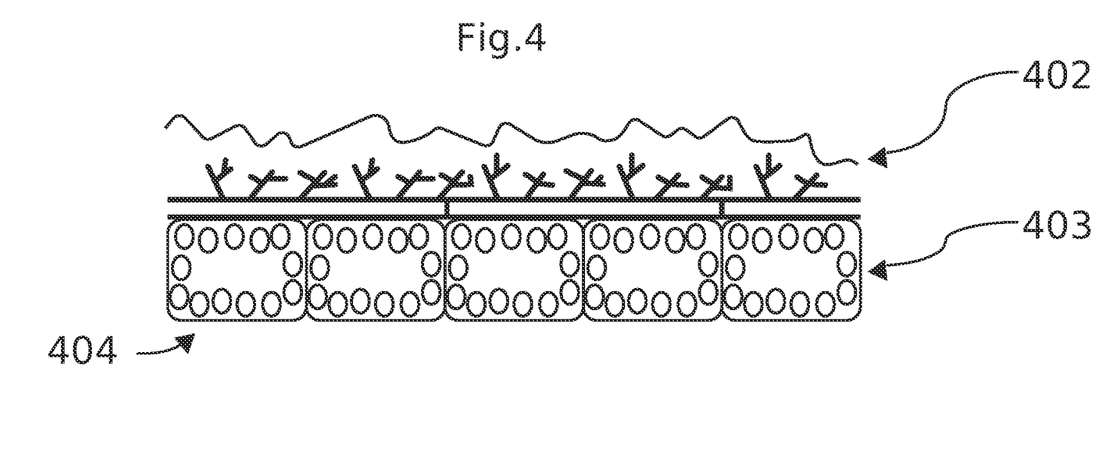
FIG. 4 is cross section of a leaf prior to laser ablation.
Figure 5:
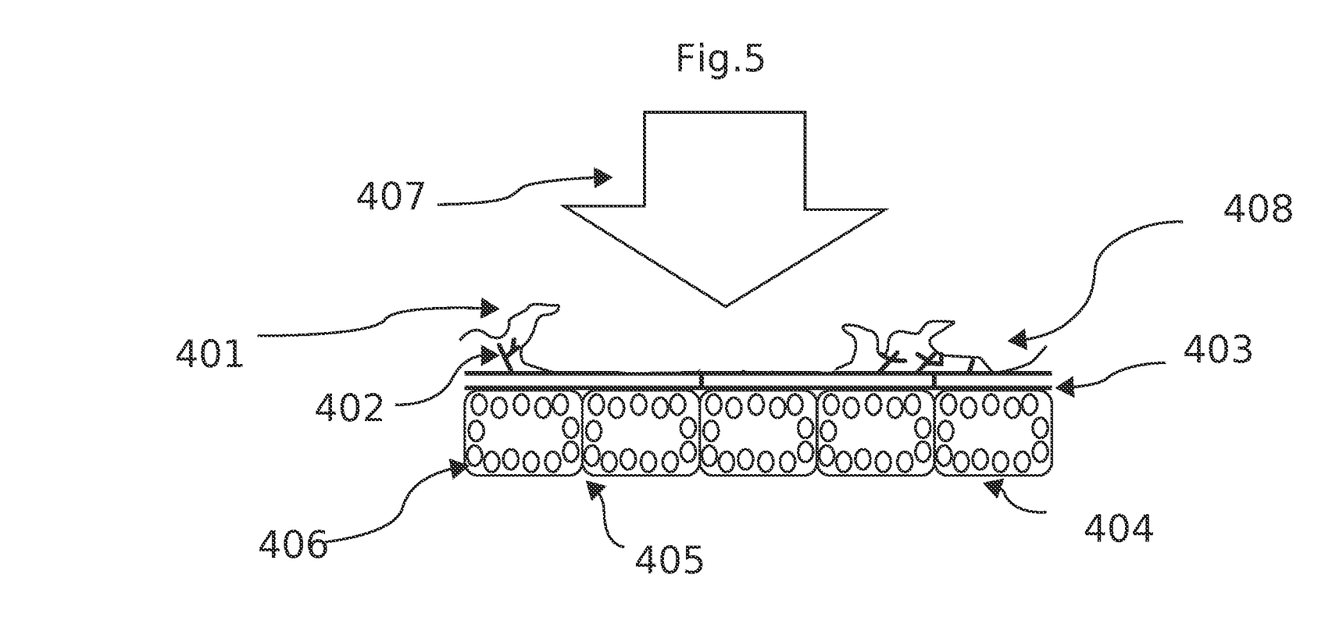
FIG. 5 is a diagrammatic representation of a laser using green wavelength as described in the present invention.
Figure 6:
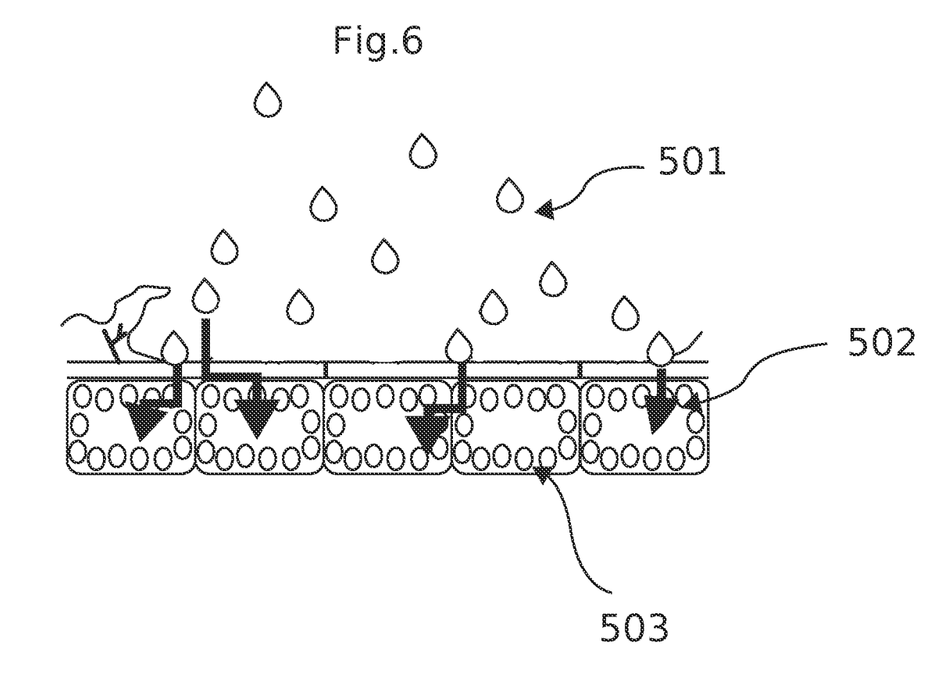
FIG. 6 is a diagrammatic representation of a therapeutic compound application and penetration through cuticle-exfoliated areas, successfully reaching the epidermal layer.
Figure 7:
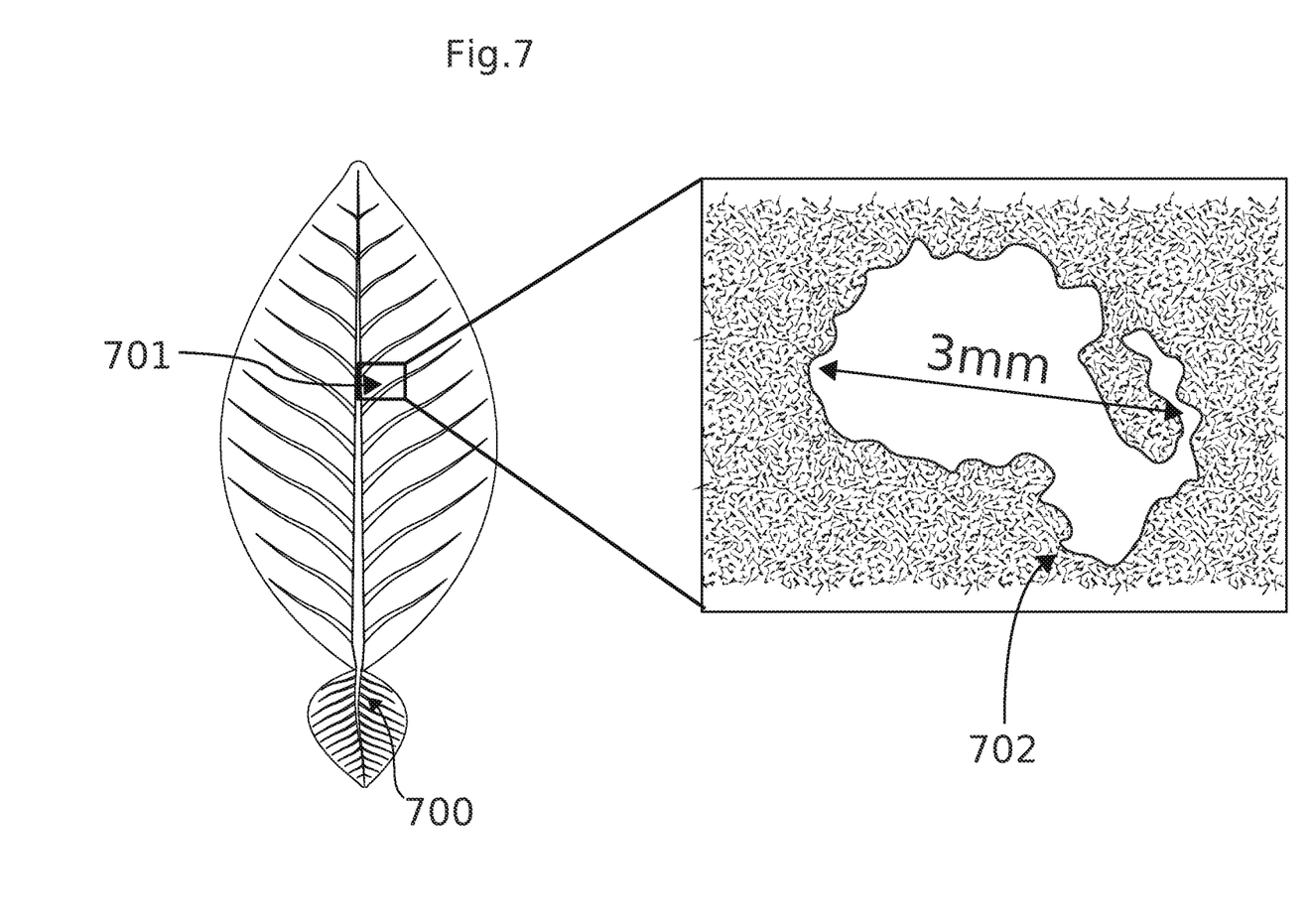
FIG. 7 is an area where the laser removed the wax and expose the epidermis, with an enlarged portion showing the area.

In FIG. 1, the invention provides a general prior art on micro-perforations as patented comprises an approach the laser perforates the cuticle. Here, the citrus leaf lasered to create perforations 1A, close-up of a single rectangle laser perforation pattern in 1A showing the cuticle perforations 1B, high magnification scanning electron micrograph of a laser-perforated leaf surface 1C and high magnification of perforated leaf surface 1D. Each perforation across the cuticle had a diameter of 300-500 μm. A pattern consisting of 150 perforations per rectangle and the total exposed area per pulse is only 0.000019 $cm^2$. Each perforation across the cuticle had a diameter of 300-500 μm. A pattern consisting of 150 perforations per rectangle. The total exposed area per pulse is only 0.000019 $cm^2$.

The second U.S. prior art Patent Application No. 202000037607 The disclosure provides a method of delivering a substance to a plant, the method comprising (a) exfoliating a region of epicuticular wax on a plant surface. The laser energy is applied using an erbium-doped yttrium aluminum garnet (Er:YAG) laser. The method is good, does not damage the leave. The main inconvenient is the high price of laser. In addition, the laser process implies an increase in temperature that can damage the epidermis.

Now turning to the invention, the present invention describes materials and methods for delivering substances to plants. The invention discloses a method to enhance substances uptake by plants using selective ablation of light pulses to remove the wax cuticle on a large scale in fields. The invention provides a method designed to improve the capture of agrochemicals through the leaves of plants, which works by removing the wax cuticle to allow access of the substances.

The invention works based on the selectivity of the action of monochromatic pulses, whose wavelength is in the green colour range. Due to its wavelength, the pulsed light is absorbed only by the wax cuticle and instead it is reflected by the epidermis without affecting it. Once the wax cuticle has been removed, the chemical substance can be applied, which will easily penetrate the interior of the plant.

In FIG. 2, the invention shows fresh citrus leaves 200 illustrating the cuticles 201. For example, the citrus leaves have a high reflection and low absorption, while the wax cuticle have a high absorption. It has a good selectivity, which means that wax cuticle will be selectively ablated while the epidermis will be preserved without damages.

According to FIG. 3, the said invention provides a step of selective ablation by laser using wavelength in the green range of spectrum 300. It describes an absorption spectrum of leaf extract 301, comprising a wavelength range of between 350 and 700 nm and an absorption coefficient of 0.02 and 0.2 $m^{-1}$ 302. The implications of laser selectivity further comprise a minimal damage to cuticle and leaf structure, high removal of wax rate. For example, for the second harmonic of Nd laser (532 nm). In addition as discussed above in FIG. 2, the citrus leaves 200 have a high reflection and low absorption, while the wax cuticle have a high absorption. It has a good selectivity, which means that wax cuticle will be selectively ablated while the epidermis will be preserved without damages.

In FIG. 4, the invention avails a prior to laser ablation 400 state of the leave 200 illustrating dew 401 covering the epicuticular wax 402, epidermis 403 covering the inner tissues 404 further comprising inner cells 406 and the air space between the tissues presented as stomata 405.

Still on FIG. 4, the invention presents a laser using green wavelength 407 showing penetrating the due 401 and epicuticular wax 402 to the epidermal layer 403.

FIG. 5 shows a therapeutic compound 501 application and penetration through cuticle-exfoliated areas 502 and successfully enabling the compound 501 to reach the epidermal layer 404. Immediate effect of laser impacting the leaf surface 401 and generating accessibility for therapeutic compounds 501 through wax cuticle exfoliation 402. Therapeutic compound 501 application and penetration through cuticle-exfoliated areas 402, successfully reaching the inner epidermal layer 404.

In FIG. 6, the invention shows area where the laser 407 removed the wax 402 and expose the epidermis 403. Within the treated area 601, the laser removes the wax 402 but does not affect the epidermis 403. A large area 602 from mm to cm in diameter with a single laser shot! There is no perforation or thermal damage! It shows Nd:YAG laser, wavelength: 532 nm, pulse duration: 20 ns burst mode and repetition rate: 1-10 Hz.

Some advantages are noted here. The leaves epidermis looks green due to chlorophyll 503 reflectance for that wavelength as shown in FIG. 5. The wax absorbs this wavelength, but the epidermis reflects it. Laser pulses 532 nm wavelength should be used for selective wax removal. Short duration process (nanosecond range) minimizing thermal impact. It does not need to be focused with a lens. Easy to implement for field conditions. Compact, portable laser. Low cost.

The present invention is not limited to the embodiments described above. Various changes and modifications can, of course, be made, without departing from the scope and spirit of the present invention. Additional advantages and modifications will readily occur to those skilled in the art. Accordingly, various modifications may be made without departing from the spirit or scope of the general inventive concept as defined by the appended claims and their equivalents.

It will also be appreciated that such development effort might be complex and time-consuming, but would nevertheless be a routine undertaking for those of ordinary skill in the field of the appropriate art having the benefit of this disclosure. Accordingly, the Claims appended hereto are not intended to be limited by the disclosed embodiments, but are to be accorded their widest scope consistent with the principles and features disclosed herein.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

INDUSTRIAL APPLICATION The present invention applies to generally, relates to materials and methods for delivering substances to plants and in particular method to enhance substances uptake by plants using selective ablation of light pulses to remove the wax cuticle on a large scale in fields. The leaves epidermis looks green due to chlorophyll reflectance for the spectral range between 495 nm and 570 nm. The wax partially absorbs this wavelength, but the epidermis reflects it. Laser pulses within such spectral range should be used for selective wax removal. Short duration process (nanosecond range) minimizing thermal impact. It does not need to be focused with a lens. Easy to implement for field conditions. Compact, portable laser. Low cost.

What is claimed is:

1. A method to enhance substances uptake by plants using irradiating the foliar surface with pulsed laser light to ablate the epicuticular wax to remove the wax cuticle, comprising the step of:

exposing plants to an ablation of light pulses using laser light having wavelength of 532 nm thereby causing the removal of the wax cuticle but reflecting harmlessly off of the epidermis.

2. The method according to claim 1, wherein the method further comprises removing the wax and facilitating the entry of any agrochemical applied thereon.

3. The method according to claim 1, wherein the light pulses, are applied to remove the wax with an increase of temperature of the leaves of no more than 5° C., so as to not damage the leaves.

4. The method according to claim 1, wherein the exposure of plants to the ablation of light pulses is done at a duration of light pulse of between 5-50 ns.

5. The method according to claim 4, wherein once the wax cuticle has been removed-chemical substances are applied to and penetrate into the interior of the plant.

6. The method according to claim 1, wherein the ablation by laser is done at:

an absorption coefficient of 0.02 and 0.2 m−1.

7. A method for delivering substances to plants, comprising step of:

applying a laser ablation using a green wavelength of 532 nm so as to penetrate epicuticular wax to the epidermal layer thereby enabling a subsequent therapeutic compound application to penetration through cuticle-exfoliated areas to reach the epidermal layer.